United States Patent [19]

Thomas et al.

[11] 4,141,000
[45] Feb. 20, 1979

[54] INTERACTIVE DISPLAYS COMPRISING A PLURALITY OF INDIVIDUAL DISPLAY ELEMENTS

[75] Inventors: Roy Thomas, Ashford; Brian V. Norton, London, both of England

[73] Assignee: Data Recording Instrument Company, Ltd., Stevenage, England

[21] Appl. No.: 658,723

[22] Filed: Feb. 17, 1976

[30] Foreign Application Priority Data

Feb. 21, 1975 [GB] United Kingdom ............... 7290/75
Feb. 21, 1975 [GB] United Kingdom ............... 7298/75

[51] Int. Cl.² .......................................... G06F 3/14
[52] U.S. Cl. ................................. 340/752; 178/19; 340/378.1
[58] Field of Search ...... 340/324 M, 324 A, 324 AD, 340/225, 378 R, 378 A; 178/18–20; 315/169 TV

[56] References Cited

U.S. PATENT DOCUMENTS

| | | | |
|---|---|---|---|
| 3,851,327 | 11/1974 | Ngo | 340/324 M |
| 3,875,472 | 4/1975 | Schermerhorn | 340/324 M |
| 3,898,643 | 8/1975 | Ettlinger | 340/324 A |

Primary Examiner—Marshall M. Curtis
Attorney, Agent, or Firm—George R. Douglas, Jr.; Anthony D. Cennamo

[57] ABSTRACT

An interactive display having an array of independently labelled display elements such as LEDs. The output of a recirculating shift register is supplied as long or short pulses which are scanned across the array. Each element in response emits either long flashes and appears lit or short flashes and appears unlit. A light-pen, when pointed at an element, detects the flash from that element, and causes a bit of the opposite sense to be introduced into the shift register in place of the recirculated bit. The display state of each element can thus be changed, both from lit to unlit or vice versa. The contents of the shift register can also be transferred to exterior equipment or supplied by it, allowing the display to act as an input/out device.

8 Claims, 10 Drawing Figures

INTERACTIVE DISPLAYS COMPRISING A PLURALITY OF INDIVIDUAL DISPLAY ELEMENTS

BACKGROUND OF THE INVENTION

This invention relates to interactive displays, that is, to devices that display data and also allow an operator to input fresh data or change the data that is displayed.

When the amount of data is small, one method of displaying it has been to use illuminated press switches Each switch will in general be labelled and can be regarded as displaying the value of a particular bit whose significance is indicated by the labelling.

When the amount of information is large it has been common to display it on a cathode-ray screen. In this case the information will be conveyed by the pattern of the lit areas—they may, for example form letters of the alphabet or graphic designs. Interactive input can be by a separate keyboard or, by a "light pen" which detects light from the screen and can be used to draw designs on it. It has also been proposed to use light pens with display devices using inherent-memory gas-plasma display cells or light-emitting diodes. In the devices, too, the display conveys information by the pattern assumed by the lit elements.

SUMMARY OF THE INVENTION

This invention provides an interactive display which comprises an array of discrete display elements each of which produces an optical output in response to a drive input; labelling giving each display element an independant significance; storage means, separate from the elements, for storing a plurality of bits each of which is associated with a different one of the display elements; means responsive to the values of the stored bits for generating and supplying to each display element as its drive input either a first or a second time-varying waveform, depending on the value of the associated stored bit, the first waveform causing the element to be in a first display state and the second waveform causing the element to be in a second display state visually distinct from the first and both waveforms containing a signal identifying that display element; sensing means movable by an operator over the array and arranged to serve light from a selected element and means responsive to the light-sensing means and capable, for both display states of the selected element, of detecting the signal identifying that element and inverting the value of the associated stored bit.

When the stored bit is inverted the display state of the associated stored element will be changed. An operator can thus change the display state of each element, whichever state it was in initially, by using light-sensing means, and the information that he inputs will be held in the storage means. He can see the information he has input displayed, and can verify and correct it if necessary.

The display is especially suitable for displaying an amount of information between that at which it is economic to use individual press switches and that at which the complex and expensive circuitry of a cathode-ray display is justified.

Preferably the first and second waveform is a repeated cycle, the repeat cycle including as the identifying signal a pulse identifying the display element it is supplied to by its timing. The drive waveform for every element in one of the display states may be such that the element appears substantially continuously lit. Alternatively, for example for the other display state, it may be such that the element appears in operation substantially unlit. If it appears substantially continuously lit the repeat cycle may include one or more further pulses in addition to the identifying pulse.

Preferably the storage means comprises recirculating shift-register means.

There may be means for outputting a signal indicating the value of at least those bits whose value has been changed, the display being combined with processing means arranged to respond to that signal. Thus the data that is input to the display by the operator is transferred to the processor. There may be input means separate from the light sensing means for setting the value of at least selected ones of the stored bits. Thus the display can also be used to display data output for, say, the processing means.

BRIEF DESCRIPTION OF THE DRAWINGS

Apparatus constructed in accordance with the invention will now be described in greater detail by way of example with reference to the accompanying drawings in which.

DESCRIPTION OF THE PREFERRED EMBODIMENTS

Figure 1:
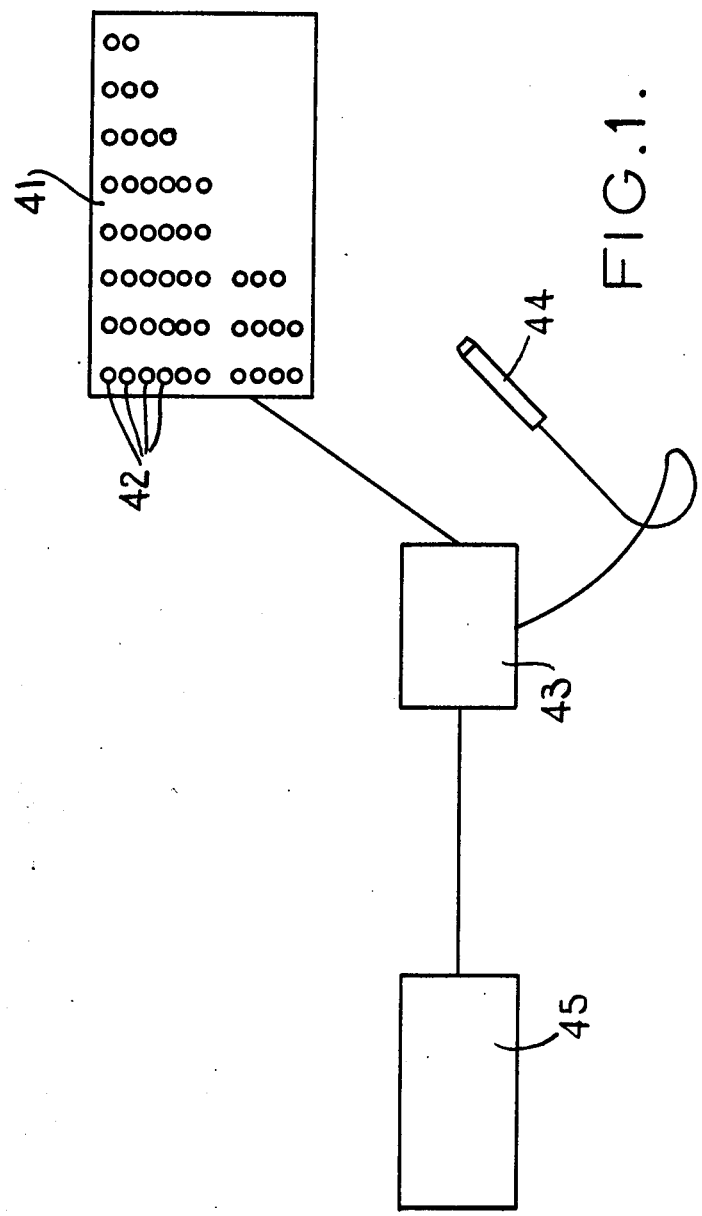
FIG. 1 is a diagrammatic representation of an example of a system including a display according to the invention.

Referring to FIG. 1, a system will first be described which includes a display such as will be described with reference to the later figures. The display has a regular array 41 of light-emitting diodes 42 which appear lit or unlit. The individual LED's have labelling (not shown) which indicates their significance.

The LEDs are energised from control circuitry 43 which scans the array 41, supplying short pulses to the unlit LEDs and long pulses to the lit LEDs. The duration and frequency of the pulses are such that they are not individually perceptible. A light pen 44 (a wand carrying a photo-sensitive transitor) can be brought by an operator up to a selected LED and indentifying the LED by the timing of the flash it senses, cause the control circuitry 43 to change the state of illumination of that LED. The device can thus be used to input data. This data can be transferred to other equipment, shown as a box 45, the nature of which will depend on the application. This equipment can be arranged to process the data, as will be explained in greater detail hereafter, and to return information to the control circuitry 43 which can output it on the array 41.

Figure 2:
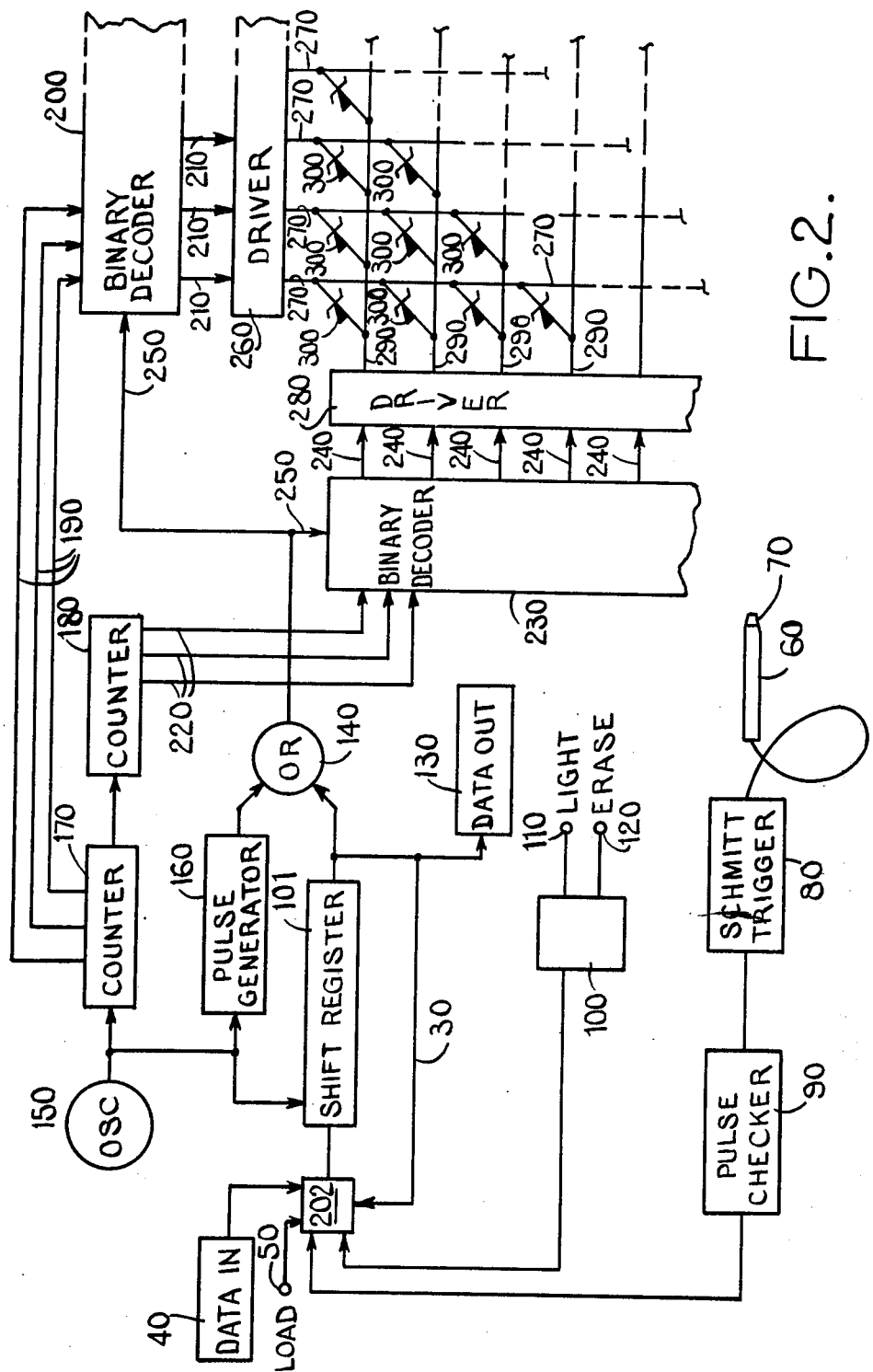
FIG. 2 is a block diagram of a first form of display according to the invention.

A first form of display that can be used in such a system will now be described in more detail. Referring to FIG. 2, the data to be displayed is held in a shift register 101. It receives its input from a logical net 202 (described in more detail with reference to FIG. 5) to which there are various inputs. One is the output from the register 101 itself, which is recirculated along a path 30. The others are data from an input register 40, entered under the control of a LOAD signal 50, and the signal from a wand 60 holding a photo-sensitive transistor 70. This signal passes through a Schmitt trigger 80 and a pulse checker 90 and is entered under the control of a bistable 100 have a LIGHT state 110 and an ERASE state 120.

Besides being recirculated, the output from the register 101 goes to an output data register 130 and an OR gate 140.

An oscillator 150 clocks the shift register 101. It supplies clock pulses which advance the contents of the register state by stage. The clock pulses are also supplied to a pulse generator 160, the output of which forms the second input to the OR gate 140; and a pair of binary counters in sequence, a less-significant counter 170 and a more-significant counter 180. The output from the counter 170 is in parallel along the lines 190 and goes to a column decoder 200 having outputs 210 (not all shown); the output from the other counter 180 is in parallel along the lines 220 and goes to a row decoder 230 having outputs 240 (not all shown). The two decoders 200 and 230 are enabled by the output 250 from the OR gate 140. Each output 210 from the column decoder 200 passes through a driver 260 to a line 270 and each output 240 from the row decoder 230 passes through a driver 280 to a line 290; the two drivers 260 and 280 are described in more detail with reference to FIG. 4.

Light emitting diodes 300 (not all shown) are connected as an orthogonal array or matrix between each of the pairs of lines 270 and 290. These diodes 300 display the data stored in the register 101. There are as many diodes 300 as there are stages in the register 101, which in turn equals the number of bits to be displayed.

The operation of the device will now be described. It will first be assumed that the register 101 has just been loaded with input data and that no signal is being received from the photo-sensitive transistor 70 in the wand 60. That means that the device is displaying static data which is not being modified by the operator. Under these circumstances the output from the register 101 is recirculated along the path 30 through the network 202 back to the input to the register 101.

Each stage of the register 101 will hold a separate one of the bits to be displayed, the stage being (say) set if it holds the value ONE and unset if it holds the value ZERO. As an example, it has proved suitable in this form of apparatus to use a register of sixty-four stages.

Figure 3:
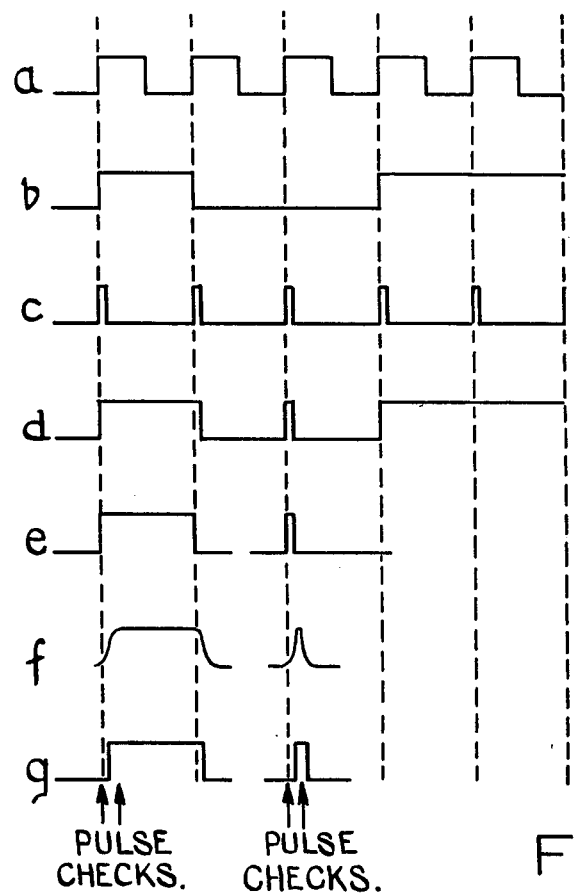
FIG. 3 shows waveforms at various points in the circuitry of the first form of display.

The oscillator 150 produces square-wave clock pulses. (see also FIG. 3a). At every clock pulse the contents of the shift register 101 are advanced by one stage and the emerging bit is recirculated via the path 30 with the appropriate delay introduced. Thus the position in which any particular bit is stored will vary during the cycle, each bit returning to its original position in the register after a complete cycle of as many clock pulses as there are stages in the register.

The output from the register consists of a waveform containing a signal for each emerging ONE-bit and none for each ZERO-bit (see also FIG. 3b). The waveform is repeated once each complete cycle.

The pulse generator 160 produces a short pulse at the start of every clock pulse (see also FIG. 3c). The outputs from the pulse generator 160 and the shift register 101 are both applied to the OR gate 104, and if the emerging stored bit is a ONE the signal that represents it will absorb the short pulse from the pulse generator; if the stored bit is a ZERO the OR gate will superimpose the short pulse on the output from the register. Therefore in the output 250 from the gate 140 (FIG. 3d) a long signal represents a ONE-bit and a short signal a ZERO-bit.

The clock pulses are also supplied to the less-significant digital counter 170. It produces a parallel binary output on the lines 190, the output advancing by one at each clock pulse. Every time the counter reaches its maximum it returns to zero and also supplies a signal that advances the second counter 180, which also produces a parallel binary output. This counter returns to zero after the complete clock cycle corresponding to the number of stored bits. With sixty-four stored bits, the two counters may as an example both count to eight, so that each has the three output lines 190 or 220 as shown. The more significant counter 180 will then advance once every eight clock pulses and return to zero after sixty-four pulses.

The binary decoder 200 has a separate output 210 for each value of the counter 170, and (provided it is enables see below) produces a signal on the line 210 corresponding to the current value of the counter. The output of the decoder 200 thus scans the various lines 210 in turn. The decoder 230 functions similarly and produces an output on each line 240 in turn, the signal advancing once every cycle of the decoder 200. There are thus, at any one time, outputs to a pair of lines 240 and 270. The drivers 260 and 280 then allow current to flow through the corresponding pair of lines 270 and 290, energising the lightemitting diode 300 that connects them.

The output from the decoders 200 and 230 is inhibited unless there is a signal on the output 250 from the OR gate 140 which enables the decoders. There is such a signal once every clock interval, either long or short, depending on the value of the corresponding bit at the output of the register 101. The action of the counter 170 and 180 and the decoders 230 and 250 is thus to scan the diodes 300 one by one and row by row directing energising pulses to each of them in turn (see FIG. 3e, which shown the long and short pulses directed to separate diodes).

As a result of being energised each diode 300 emits a flash of light. The length of a flash depends on the length of the energising pulse but its exact shape and timing depends on the characteristics of the diode.

Each individual diode 300 receives the pulses representing the particular bit whose timing corresponds to the stage in the cycle at which it is scanned. Each diode is thus associated with a different bit and will emit either short or long flashes depending on the value of that bit.

The durations of the energising pulses and the frequency of the complete scanning cycle are chosen to be such that a diode energised by long pulses appears lit and substantially flickerfree to an observer in normal lighting conditions, and a diode energised by short pulses appears not to be lit. As examples of values that have proved suitable, with sixty four stages the long pulses may be 200 microseconds and take substantially a whole clock interal (giving approximately 78 flashes per second) and the short pulses 20 microseconds.

The appearance of the diodes will depend on the conditions in which they are observed. A diode energised by short pulses which appears completely unilluminated in normal conditions may glow noticeably in a darkened room. Nevertheless there will still be enough contrast between the two stages of illumination for the operator to be able to determine whether a diode is "on" or "off".

The diodes 300 can be overdriven (that is, run at more than their specified power rating) for the short periods they are energised without the average consumption over the whole cycle exceeding that rating. For example, with sixty-four stages it has been found satisfactory to overdrive the diodes factor of four. The apparent brightness will then be greater than if the diodes were run, during the periods for which they are illuminated, at their specified rating. The brightness of the diode can be made variable by providing an adjustment for the degree of overdrive.

Figure 4:
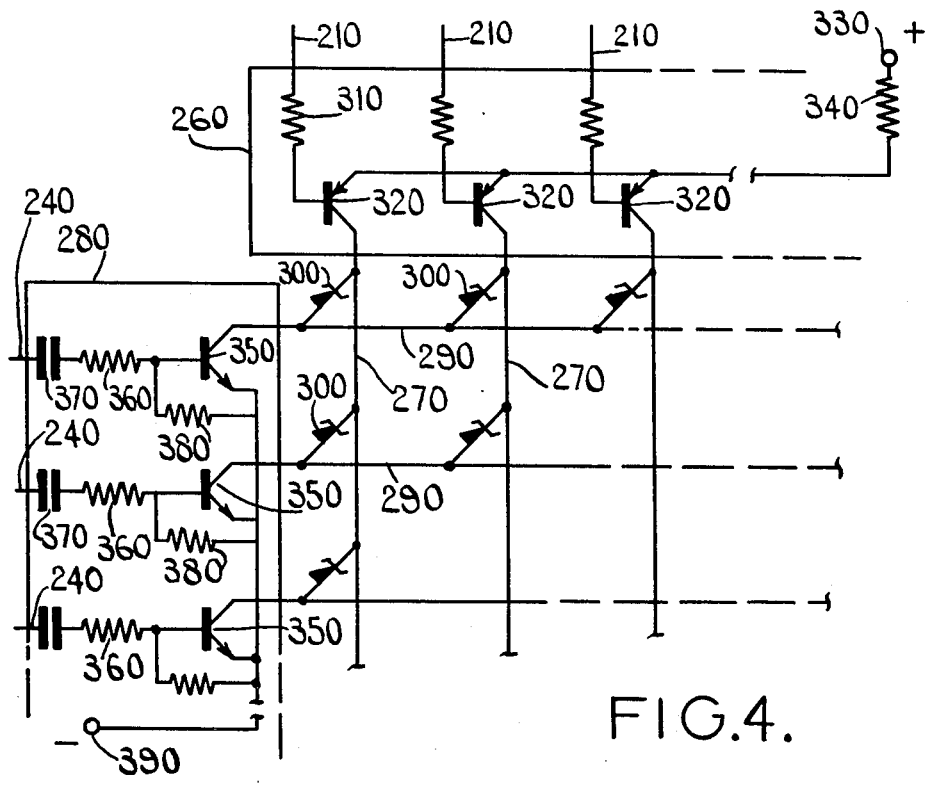
FIGS. 4 and 5 are circuit diagrams of parts of the first form of display.

Referring to FIG. 4, the driver circuits 260 and 280 will now be described. Each line 210 is connected to the base of a transistor 320 through a base current limiting resistor 310. The transistor 320 receiving a signal will supply current from a supply 330 through a power limiting resistor 340 to the corresponding column-conductor 27.

The row-conductors 240 are connected to transistors 350, the appropriate one of which is made conductive by a signal to its base, which is connected through a base current limiting resistor 360 and capacitor 370 to one of the lines 240 and through a bias resistor 380 to the negative supply 390.

The capacitor 370 provides AC coupling to ensure that if the scanning cycle stops the diodes will be protected against overload.

Figure 5:
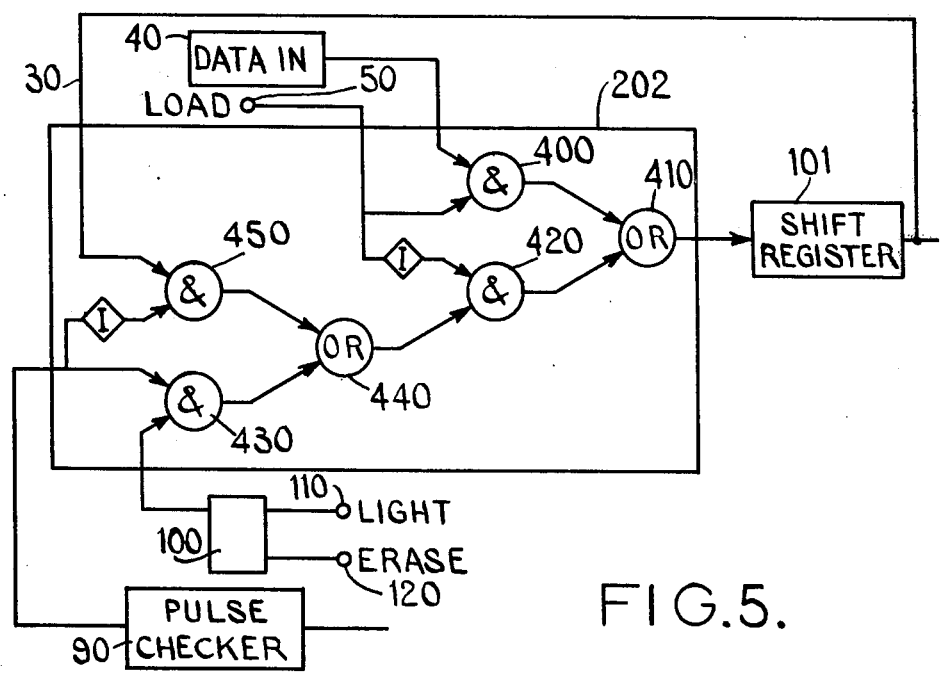

Referring to FIG. 5, the logic net 202, will now be described in more detail. The data from the input register 40 and the LOAD signal 50 are passed through an AND-gate 400 to an OR-gate 410 and thence to the input of the shift register 101. The LOAD signal 50 is also inverted and applied to an AND-gate 420 whose output is the other input to the OR-gate 410.

The outputs from the pulse-checker 90 and bistable 100 pass through an AND-gate 430 to an OR-gate 440. The signal from the pulse-checker is also inverted and applied with the recirculated signal on the path 30 to an AND-gate 450. Its output goes to the OR-gate 440, which feeds the AND-gate 420.

It has so far been assumed that the device is displaying static information. There is then no signal from the pulse checker and no LOAD signal 50. The signal on the path 30 is therefore recirculated to the register 101. However, the displayed data can also be altered in two ways. First, it can be entered from an external source, for example a computer. This happens when there is a a LOAD signal 50, which inhibits recirculation through the gate 420 and allows data from the input register 49 to be admitted. The LOAD signal may be present for a full repeat cycle, allowing a complete fresh set of contents to be entered, or may allow an individual bit to be replaced. By alternately clearing and setting a particular bit at intervals of several cycles the associated diode can be caused to flash, for example to attract an operator's attention.

The state of individual stored bits can also be altered by an operator. Consider the case where he wishes to set the bit associated with an unlit diode. First, the bistable 100, which may be operated by a switch on the wand 60, is set in the LIGHT state in which it produces an output on line II. The operator points the wand 60 at the diode and the photo-sensitive transistor 70 picks up the short flashes from it. For each flash it will produce an output (FIG. 3) which will be rounded by the cumulative characteristics of the light-emitting diode 300 and the photo-sensitive transistor 70.

This output is checked first for level by the Schmitt trigger 80 which prevents the wand responding to stray light or other diodes and produces a square wave when operated by a valid signal (FIG. 3), and then for timing by the pulse-checker 90, which tests for an output just before and after output from the Schmitt trigger 80 is due to start. If these conditions are both met it produces an output. This output inhibits recirculation through the gate 450. The bit which would be due to be recirculated is the bit causing the flash detected (in this instance an unset bit since the diode is unlit). In its place the output from the pulse-checker allows the output from the bistable 100 to be introduced into the shift register, and the appropriate bit is thus set. In the next cycle it will cause a long flash from the associated diode corresponding to the lit state. While the wand is pointed at the diode (and clearly it cannot be removed instantaneously) the pulse-checker will detect these flashes, and re-introduce the bit afresh each cycle.

Alternatively, the pulse-checker can additionally test for a signal after the short pulse is due to be ended. This permits the type of pulse to be determined. A gate can then be included to allow the long pulse to inhibit the transmission of the signal from the pulse-checker to the net 202. Thus only the detection of the initial short pulse inhibits recirculation and sets the appropriate bit.

To erase a bit, the bistable 100 is cleared to the ERASE state and the wand pointed at the associated diode. The pulse checker will pass the sensed pulse, which inhibits recirculation of the bit that caused the long flash There is now no other signal at the gate 430, so there is no input to the register 101 from the wand. The appropriate bit is thus cleared and the diode extinguished. Again, if the pulse checker distinguishes between long and short pulses, recirculation can be restored when the short flashes resulting from the cleared bit are detected.

The response of the wand to the following circuitry can be made specific enough for there to be a response from one diode at a time only, and not simultaneously from any of its neighbours. This is helped if the phototransistor 70 is made directional by capping it with a fibre-optic light conducting tube. The diodes may also have a moderately restricted emission angle. There is then no need to provide the operator with any separate control to determine when the wand is to enter data; it is enough for him to bring the wand up to a diode whose state he wants to change. But, if desired, such a control can be provided as a press switch on the wand 60 controlling the signal passing along the line from the wand.

With the first form of display, when the number of diodes increases much above 100, the interval between long pulses of a lit diode becomes so great that the diode flickers noticeably and loses its brightness. The second form of apparatus offers a way of overcoming this difficulty. The principle is to introduce extra energising pulses in the waveform supplied to each lit diode.

Figure 6:
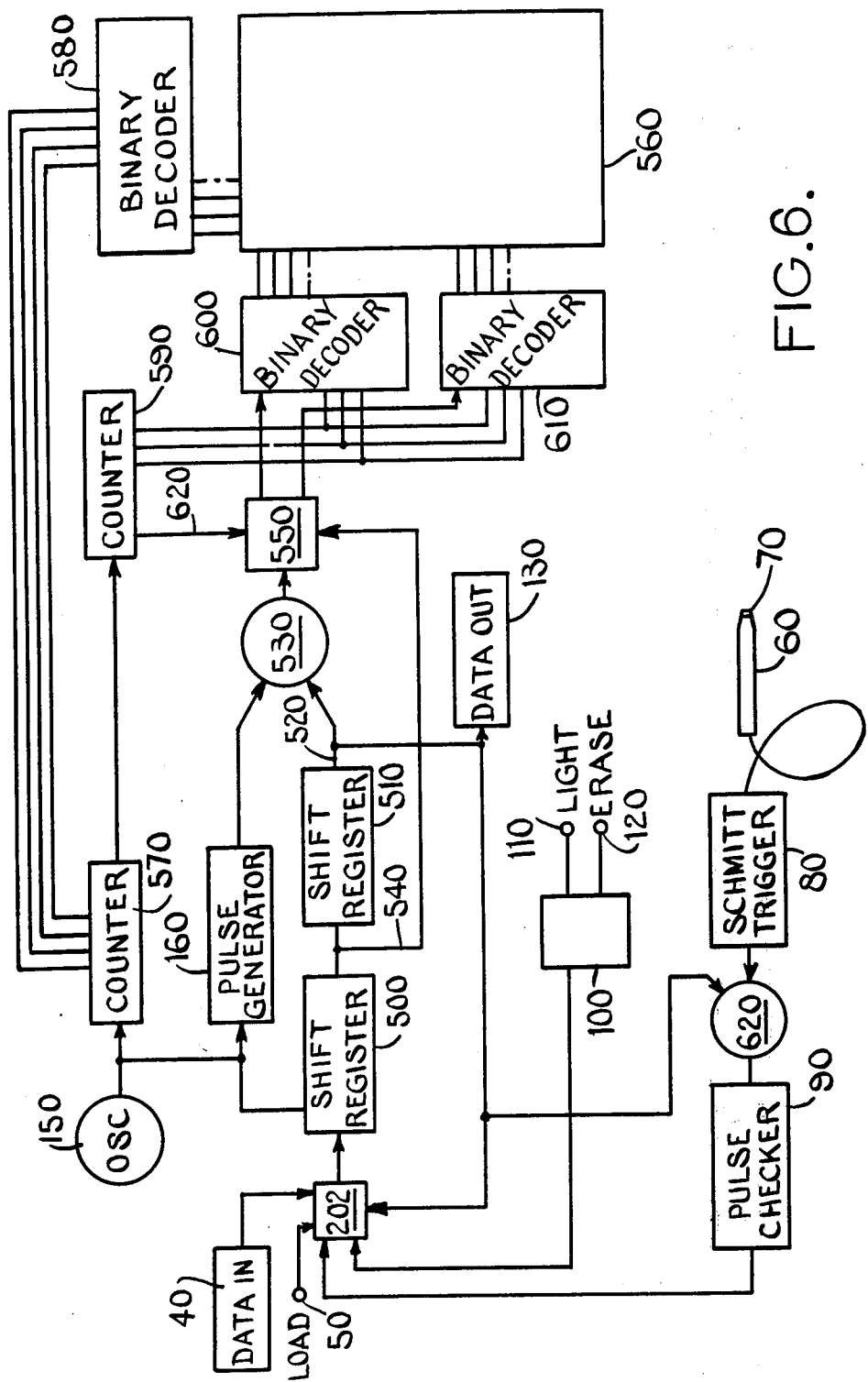
FIG. 6 is a block diagram of a second form of display according to the invention.

Referring to FIG. 6, the data to be displayed is stored in two successive serial shift registers 500 and 510 of equal capacity. The first register 500 is fed from the logic net 202. Its output goes to the second shift register 510, and also forms an intermediate output 540 from the combined shift registers. The output of the second shift register 510 is supplied to an EXCLUSIVE OR-gate 530, to which the output from the pulse generator 10 is also supplied.

Figure 7:
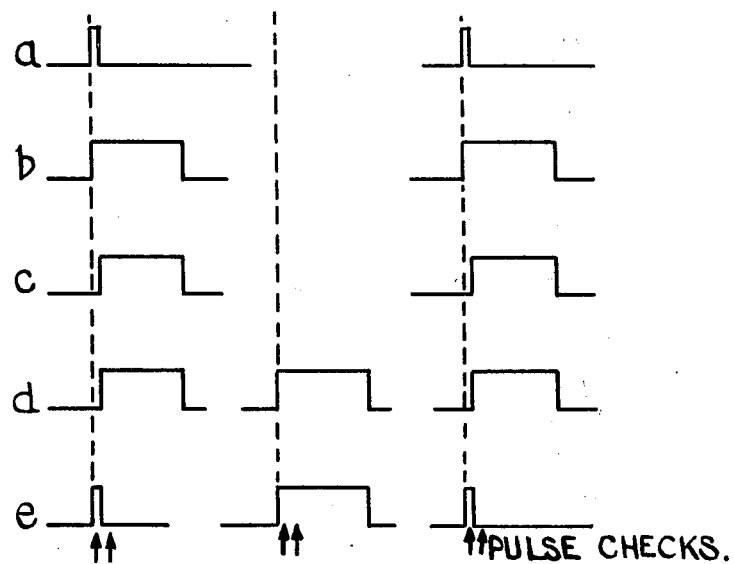
FIG. 7 shows waveforms at various points in the circuitry of the second form of display.

The pulses from the generator 160 are timed to coincide with the output of a set bit from the register 510 (FIGS. 7a and 7b show just the pulses in consecutive cycles corresponding to a particular stored bit; they come from the pulse generator 160 and shift register 510 respectively). The EXCLUSIVE OR-gate 530 therefore outputs a short pulse starting after the short pulse when a set bit emerges. This output, with the intermediate output 540 from the first register 500, is passed to a logic circuit 550.

The light-emitting diodes (not shown individually) are arranged in an array 560. The column connectors are rendered conductive in sequence in the same way as in the first form, that is, through a less significant counter 570 and column decoder 580 and drivers (not shown). However, there is no special enabling signal; each column can therefore conduct for the full clock period.

The counter 570 advances a more significant counter 590 every time it completes its cycle; the counter 590 feeds two row decoder 600 and 610 in parallel. Its most significant bit is also supplied to an output 620 to the logic circuit 550. The row decoders 600 and 610 feed the row conductors through drivers (not shown) as in the first form.

The row decoders 600 and 610 need to be enabled if they are, two diodes will be lit, one in the top half of the array from the decoder 600 and one in the bottom from the decoder 610. The two lit diodes will sweep through their halves of the array in parallel; each diode will be swept twice in each complete cycle equal to the number of stored bits.

Figure 10:
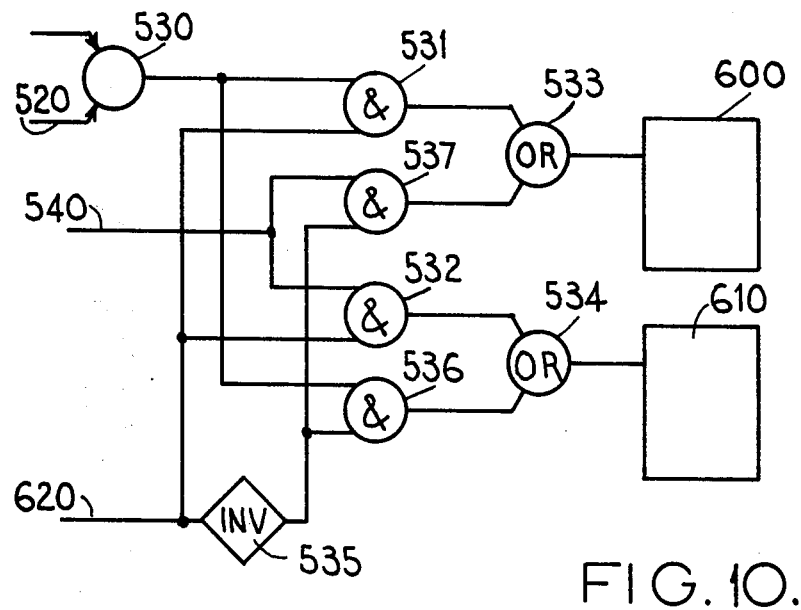
FIG. 10 is a block diagram of part of the second form.

The logic circuit 550 is shown in more detail in FIG. 10. During one half of the cycle there is a signal on the line 620 and an AND-gate 531 is enabled to supply the output of the gate 530 through an OR-gate 533 as an enabling signal to the decoder 600 of the top half of the array. Similarly, an AND-gate 532 is enabled to supply the intermediate output 540 through an OR-gate 534 as an enabling signal to the decoder 610 of the lower half of the array. During the other half cycle the connexion is interchanged. Two AND-gates 536 and 537, connected to an inverter 535 for the signal on the line 620, are enabled so that the signal from the gate 530 goes to the bottom half of the array and the intermediate output 540 to the top half. So the output from the gate 530 and the intermediate output 540 each sweep through the whole array 560 once every complete cycle.

The energising waveform supplied to a lit diode therefore (see FIG. 7d) consists in each cycle of a long pulse shortened at the front from the gate 530 and an unshortened long pulse from the output 540. For an unlit diode it consists of just the short pulse (see FIG. 7a) from the pulse generator 160.

The extra energisation and more rapid rate of flashing of a lit diode in this form compared to the first, which has only one energising pulse per cycle, make it brighter and less likely to flicker noticeably.

In any clock interval two diodes, one from each half of the array, are liable to be lit. To distinguish between them the pulse checker passes only a short pulse or a long shortened pulse; these two pulses are therefore signals identifying the particular bit to be changed. The long unshortened pulse is rejected.

The output from the Schmitt trigger 80 is applied with the recirculated bit to an EXCLUSIVE OR-gate 630 and the output (see FIG. 7e, which neglects the delay introduced by the Schmitt trigger 80) is passed to the pulse checker 90. In this output the shortened long pulse is replaced by a pulse identical to the short pulse and the two can be discriminated from the unshortened long pulse by checks during and after the period a short pulse is due. The output from the pulse checker 90 thereafter operates through the network 202 as in the first form.

The long unshortened pulse will only be passed by the gate 630 and need to be eliminated if it coincides with the bit emerging from the shift register 510 (which when combined with an identifying signal is supplied to the other half of the array) being unset.

In the pulse checker the first check is by a strobe signal derived from the pulse generator 160 and timed to coincide with the peak of the signal assuming it is a short pulse. This strobe signal is gated with the output of the gate 630 to set a bistable if there is a signal and thus passes both short and long unshortened pulses. A second strobe signal occurring after the short pulse is due to end, is gated with the output of the bistable and the inverse of the output of the gate 630. It will thus pass only the short pulse.

Extra pulse checking to distinguish the pulses from stray light can be introduced by checking in an equivalent manner for no signal before a short pulse is due. Similar methods can be used in the first form.

As in the first form means can be included to discriminate between long and short pulses and pass a signal to the net 202 only when the pulse is the length that needs to be changed for the setting of the LIGHT/ERASE control 100.

In both forms, as an additional check, the pulse checker can be followed by a shift register to store one or more cycles, the output from the register being gated with that from the pulse checker so that a final output is produced only if a signal is detected for more than one cycle.

As an example of values that have proved suitable for the second form, the array may display 256 bits with a 200 microsecond energising pulse of substantially a complete clock interval and a 20 microsecond short pulse.

The second form can be extended to greater numbers of light emitting diodes by including extra unshortened long pulses in each cycle.

Figure 8:
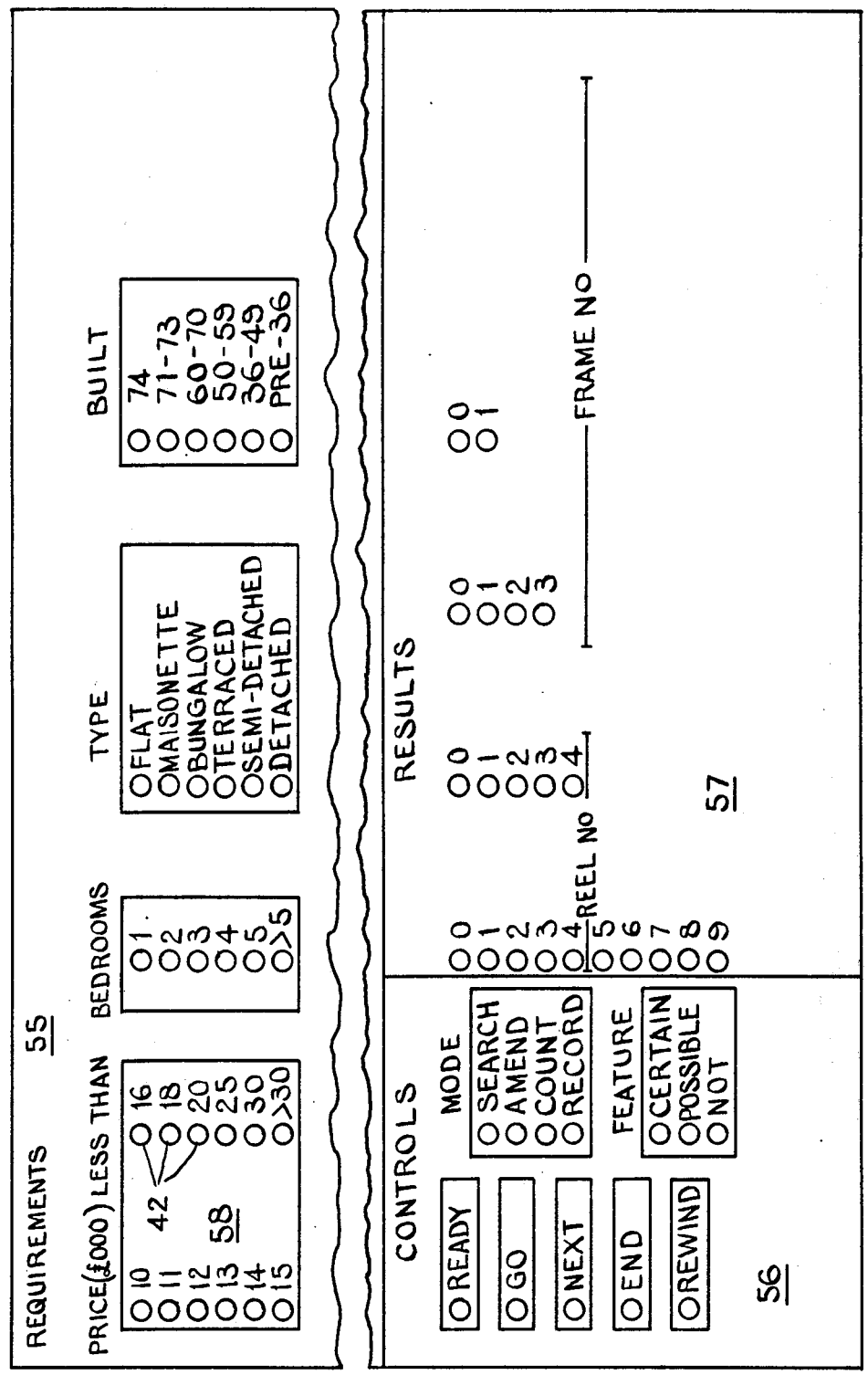
FIGS. 8 and 9 shows examples of over lay usable with the two forms of display.

The displays are labelled by replaceable partially transparent overlays. FIG. 8 is an example of such an overlay. It is mounted in a cardboard frame which fits precisely in position over the array of LEDS and may, to locate it, be provided with recesses or appertures to engage corresponding projections on the display 41.

This overlay can be used in a system for retrieving information held on microfilm. An index to the items is recorded on magnetic tape (for example by a cassette system such as is used in telemetry) as a record containing the location of the item and a series of search characteristics recorded as a binary string in which the value of each bit indicates whether or not a given condition holds. To retrieve information, a desired combination of input conditions in specified and the tape searched serially for all items matching this combination or having a specified degree of near-match. Their locations are then displayed as a guide to retrieving the actual microfilm A display system such as that shown in FIG. 1 can be used to input the original information from which the tape is recorded, to input queries, and to display the answer. In this case the equipment indicated by the box 45 of FIG. 1 is a minicomputer, the data-in register 40 of FIGS. 2 and 6 being an output register of the mini-computer and the data-out register 130 shown in FIGS. 2 and 6 being an output register of the minicomputer.

With the overlay shown in FIG. 5 the system is being used to hold details of property for sale. The overlay is divided into three sections, a Requirements section 55, a Controls section 56 and a Results section 57. The overlay is generally opaque with transparent panels through which some of the LEDs 42, which are arranged as a regular array, are visible; the panel 58 headed Price is one example. The whole Results Section 57 is also transparent. Visible LEDs are labelled by wording or numbers beside them.

Assume first that the device is to be used to input the original data that is to be recorded on the magnetic tape. The Ready diode in the Controls section 56 will glow to show that the operator can proceed. He will then point the wand 44 at the LED labelled Record in the Mode panel of the Control section 56, and this LED will light up. At the same time the control circuitry 43 will transmit the state of this LED to the mini-computer, which is programmed to recognize the significance of this particular bit being set, when it will be prepared to record the informtion to follow. (The actual programming of the mini-computer is by well known techniques and does not form part of this invention.) The operator will then input the characteristics of each house to be recorded by pointing at the appropriate LED in each panel of the Requirements section 55—that, say, the price is less than 14000, there are 3 bedrooms and it is a semi-detached house (other features such as the location, type of garage, etc. may be present but are not shown). The details of the house are followed by the reel and frame numbers of the corresponding microfilm record. The various LEDs pointed at will be illuminated. The operator can verify them, change any incorrect ones by using the ERASE switch on his wand, and then, by pointing at the Go LED in the Control section 56 cause them to be recorded.

Other properties can then be recorded similarly.

To find out if there is a property held on microfilm meeting any particular set of criteria the operator first sets the apparatus in the appropriate mode by pointing at the LED labelled Search. He then inputs the requirements, following each by pointing at one of the Feature LEDs to indicate the weight to be attached to that requirement. When he points at Go, bits will be set corresponding to the lit LEDs and the tape will be searched for records having a predetermined logical relationship of match or near-match with these bits. When one is found the mini-computer will halt the tape and output bits causing the appropriate LEDs to display the location in the Results section. When the result has been noted or inspected the operator can continue the search by pointing at Next.

Figure 9:
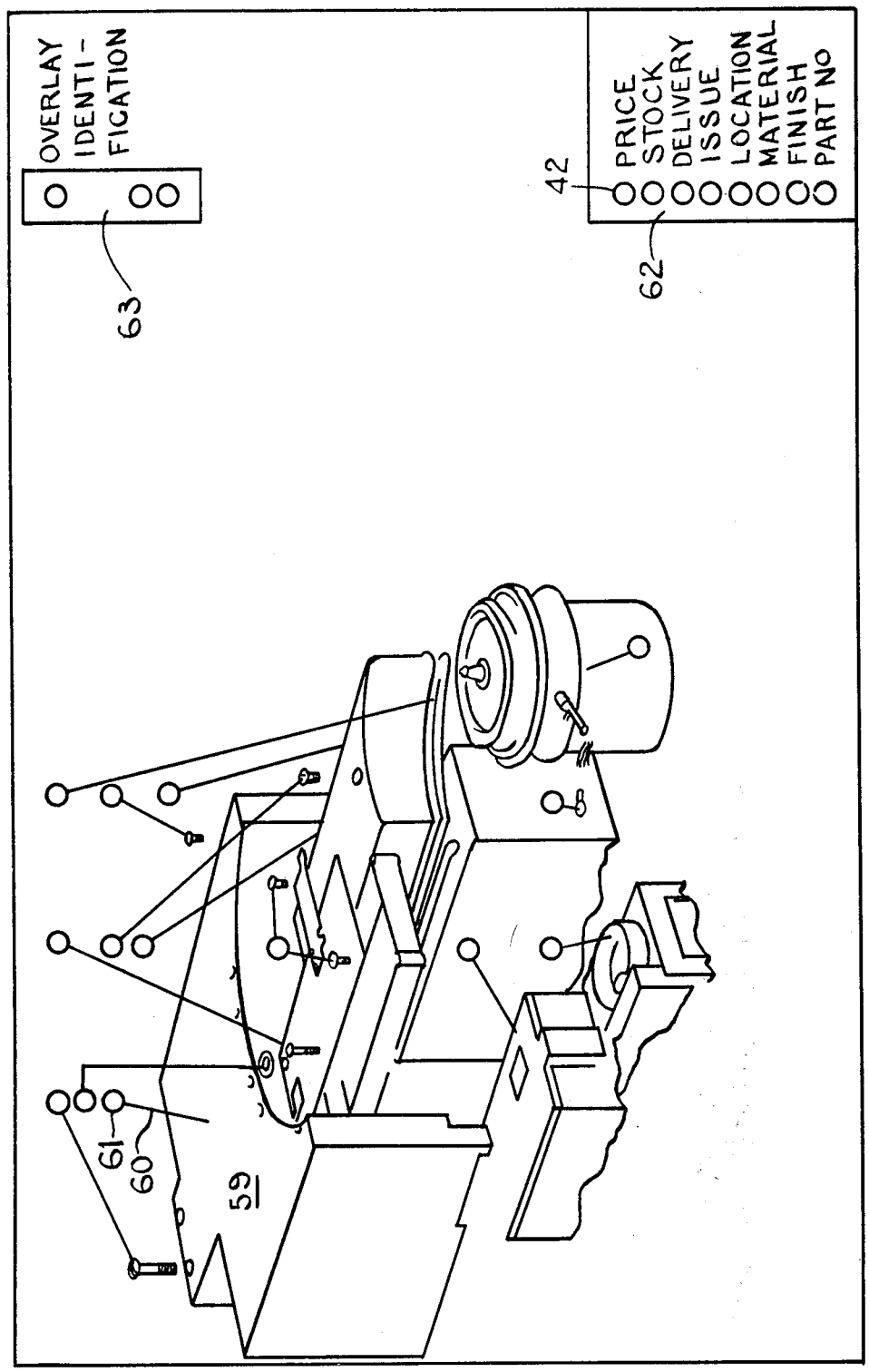

Referring to FIG. 9, the second overlay is one of a set which allows information about components to be retrieved. The invention may, for example be held on a disc file in a mini-computer system forming the other equipment 45 to which the display is connected. Each overlay shows a different exploded assembly. The various parts are connected by lead lines to transparent holes positioned over LEDs. Thus, FIG. 9 shows a housing 59 connected by a lead line 60 to an aperture 61. There is also a transparent panel 62 in which the LEDs are labelled with the tape type information required. To find out about a part the operator points the wand at the aperture connected to the part and also to the appropriate LED in the panel 62. These LEDs light and the information required is printed out.

As the overlay in FIG. 9 is one of a set, the mini-computer system must be informed which overlay is being used, so that it can attach the correct significance to LEDs which are lit. This information is coded onto the overlay itself in an area 63, in which selected LEDs, differing between the overlays, are exposed. The operator's first step after placing the overlay in position is to point the wand at each of the exposed LEDs (conveniently by drawing the wand along the column of LEDs in the area 63); the mini-computer will then determine which overlay is in use.

It is envisaged that in the place of LEDs liquid crystals can be substituted, working either by transmission or reflection. If by reflection the light-pen could include a light source to compensate for any shadowing of the LED when the pen is brought up close to it.

We claim:

1. An interactive display including:

an array of discrete display elements each of which is operative to produce a first optical output in response to a first drive waveform and a second optical output visually distinct from said first optical output in response to a second drive waveform;

each display element having an independent significance and being provided with indicia indicating the significance thereof;

storage means for storing a plurality of bits of data each of which is associated respectively with a different one of the display elements, said bits of data having first and second values;

waveform generating means operative in response to each stored bit of data respectively to apply to the display element associated therewith the first drive waveform when the stored bit of data has the first value and the second drive waveform when the stored bit of data has the second value, both said first and second drive waveforms being effective to identify said display element to which the drive waveform is applied;

sensing means movable by an operator to sense both the first and second optical outputs from a selected one of said display elements;

and control means operative in response to the sensing means sensing the first optical output from the selected one of the display elements to identify that selected element and operable to change the value of the stored bit of data associated with that selected element from the first value to the second value and in response to the sensing means sensing the second optical output from the selected one of the display elements to identify that selected element and to change the value of the stored bit of data associated with that element from the second value to the first value.

2. An interactive display including:

an array of discrete display elements each of which is operative to produce a first optical output in response to a first drive waveform and a second optical output visually distinct from said first optical output in response to a second drive waveform;

indicia associated with each display element to indicate the significance of each display element;

storage means for storing a plurality of bits of data each of which is associated respectively with a different one of the display elements, said bits of data having first and second values;

waveform generating means operative in each of a plurality of cycles to address each of the display elements sequentially to apply thereto the first waveform when the stored bit of data associated with the addressed display element has the first value to produce said first optical output and to apply thereto the second waveform when the stored bit of data associated with the addressed display element has the second value to produce said second optical output; sensing means positionable by an operator to receive the first and second optical outputs for a selected one of the display elements;

and control means operative in response to the sensing means receiving the first and second optical outputs from a selected one of the display elements to identify that selected element by the time in the cycle at which the first and second optical outputs are received by the sensing means and operable in response to the sensing means receiving the first optical output to change the stored bit of data associated with the selected element from the first value to the second value and in response to the sensing means receiving the second optical output to change the stored bit of the data associated with the selected element from the second value to the first value.

3. An interactive display as claimed in claim 1 in which the waveform generating means is operative in each cycle to generate and apply a single pulse to each display element.

4. An interactive display as claimed in claim 3 in which the waveform generating means is operative in response to a stored bit of data of said first value to generate the single pulse with a duration such that, at the frequency of the cycle, the display element appears substantially unlit.

5. An interactive display as claimed in claim 3 in which the waveform generating means is operative in response to a stored bit of data of said second value to generate the single pulse with a duration such that at the frequency of the cycle, the display element appears substantially continuously lit.

6. An interactive display as claimed in claim 2 in which the waveform generating means in response to a stored bit of data of said first value is operative to generate and apply to the associated display element in each cycle a single pulse with a duration such that, at the frequency of the cycle, the display element appears substantially unlit and in response to a stored bit of data of said second value to generate and apply to the associated display element in each cycle a first pulse and at least one further pulse each of which are effective to produce a visually apparent optical output, the duration of said first and further pulses at the frequency of the cycle being such that the display element appears substantially continuously lit.

7. An interactive display as claimed in claim 1 in which the storage means comprises a shift register having a plurality of storage stages each containing one of the bits of data and including read out means operative to read out sequentially in each of a plurality of repetitive cycles the contents of the storage stages to produce a first cyclical wavetrain in which each bit of the second value is represented by a long pulse and each bit of the first value is represented by the absence of a pulse; pulse generating means operative to produce a short pulse in synchronism with the read out of each storage stage, said short pulse having a duration less than the duration of the long pulse; gating means combining the cyclical wavetrain with the short pulses from the pulse generating means to produce a cyclical waveform; scanning means operative in synchronism with the sequential read out of the storage stages to apply the cyclical waveform sequentially to the display elements so that display elements associated with a bit of said first value receive one of said short pulses in each cycle and display elements associated with a bit of said second value receive one of said long pulses in each cycle.

8. An interactive display as claimed in claim 7 including means for producing a further cyclical wavetrain displaced in time from the first cyclical wavetrain and scanning means for directing each pulse representing a bit of second value in the further wavetrain to the display element associated therewith.

* * * * *